Figure 1:
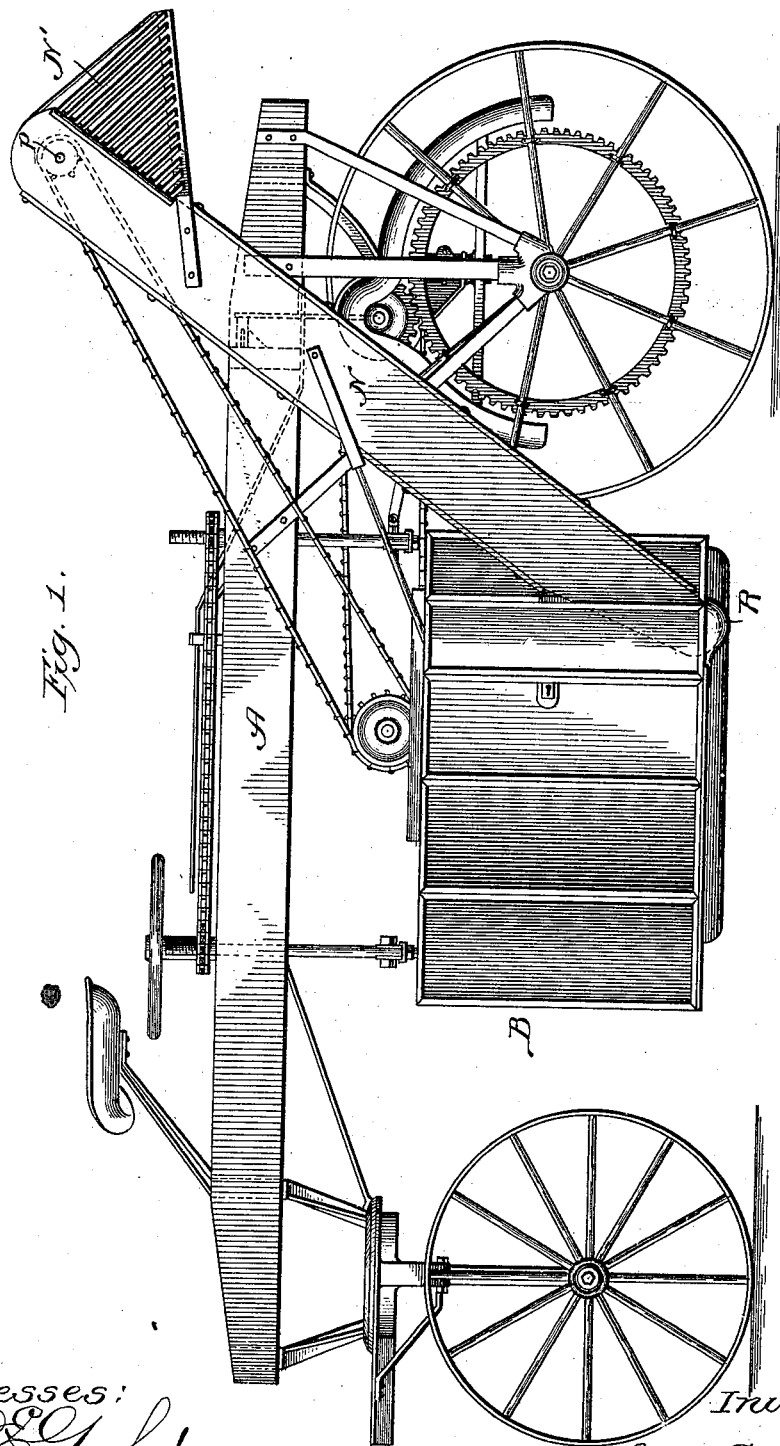

No. 685,441. Patented Oct. 29, 1901.
A. CAMPBELL.
COTTON HARVESTER.
(Application filed Apr. 15, 1901.)
(No Model.) 6 Sheets—Sheet 1.

No. 685,441. Patented Oct. 29, 1901.
A. CAMPBELL.
COTTON HARVESTER.
(Application filed Apr. 15, 1901.)
(No Model.) 6 Sheets—Sheet 3.

Witnesses:
Inventor:
Angus Campbell,
By Dyrenforth, Dyrenforth & Lee,
Att'ys.

THE NORRIS PETERS CO., PHOTO-LITHO., WASHINGTON, D. C.

No. 685,441. Patented Oct. 29, 1901.
A. CAMPBELL.
COTTON HARVESTER.
(Application filed Apr. 15, 1901.)
(No Model.) 6 Sheets—Sheet 4.

Witnesses:
Inventor:
Angus Campbell,
By Dyrenforth, Dyrenforth & Lee,
Att'ys.

No. 685,441. Patented Oct. 29, 1901.
A. CAMPBELL.
COTTON HARVESTER.
(Application filed Apr. 15, 1901.)
(No Model.) 6 Sheets—Sheet 5.
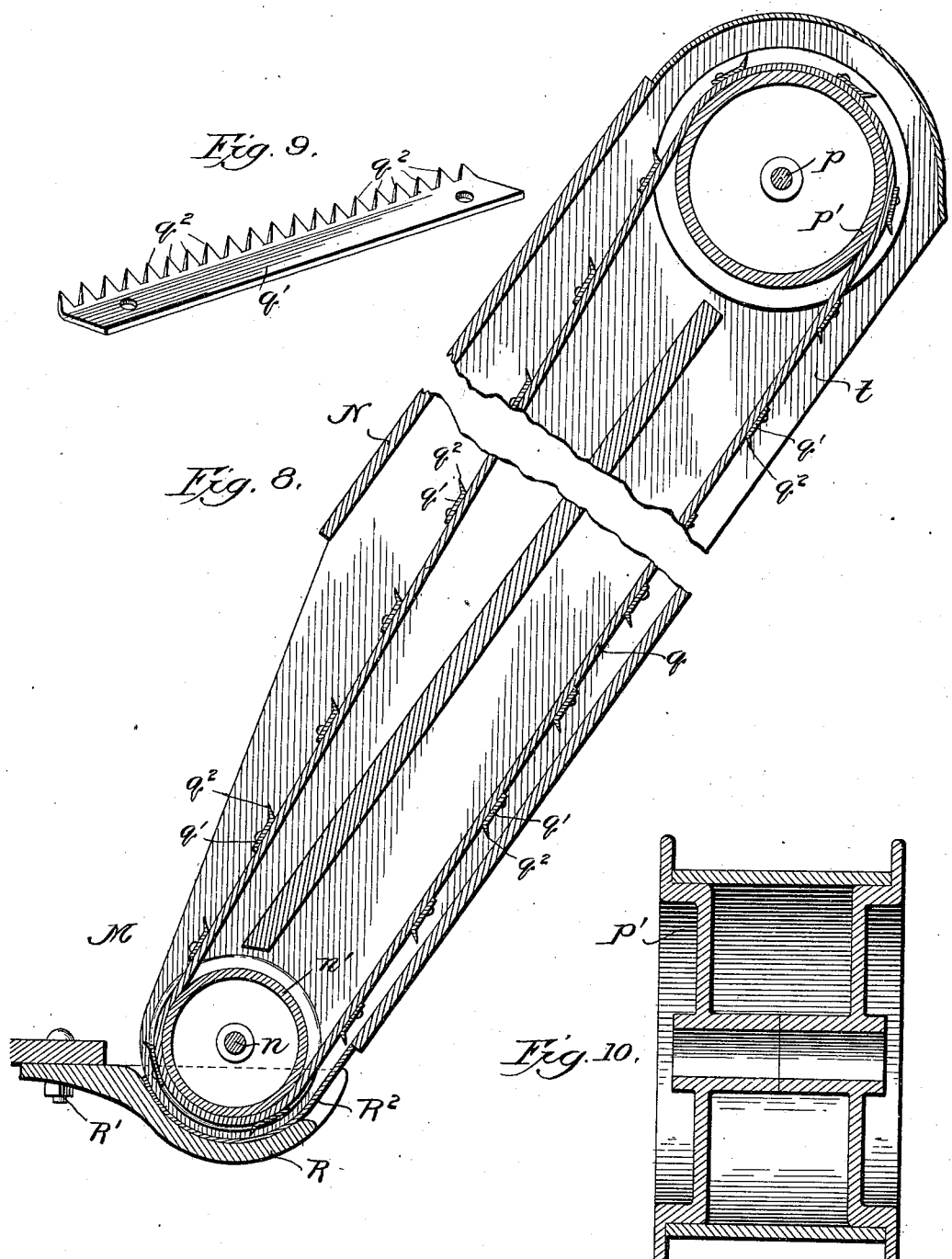

No. 685,441. Patented Oct. 29, 1901.
A. CAMPBELL.
COTTON HARVESTER.
(Application filed Apr. 15, 1901.)
(No Model.) 6 Sheets—Sheet 6.
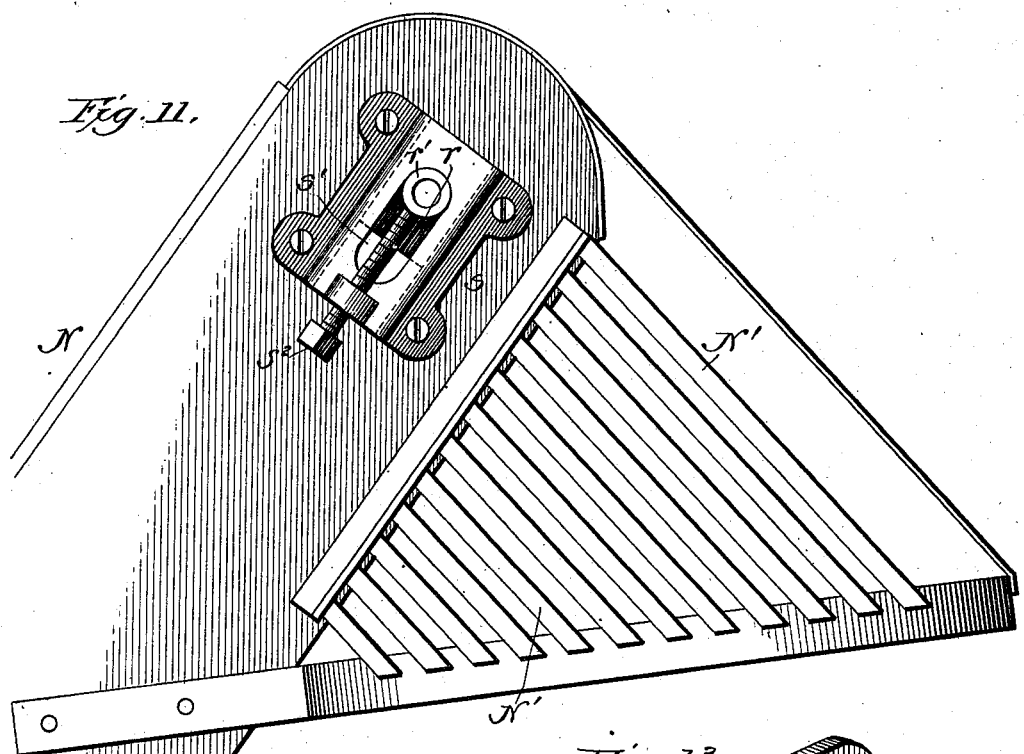
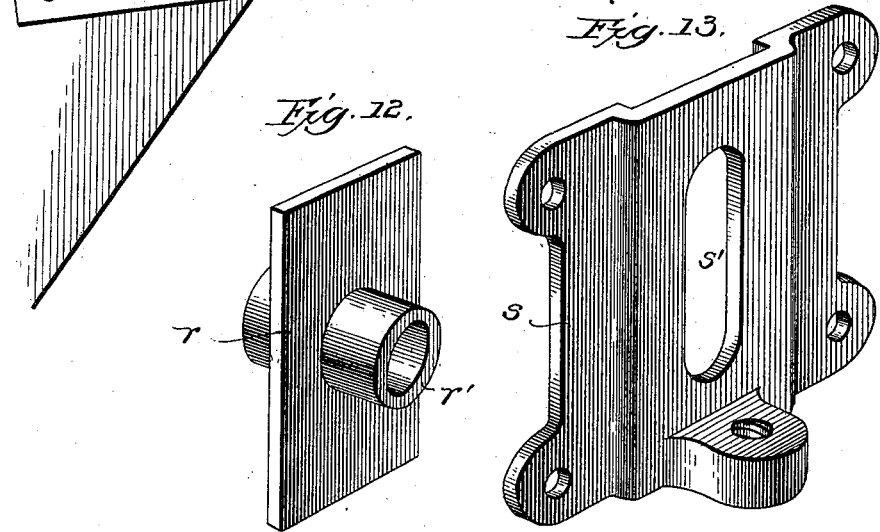
Witnesses:
Inventor:
Angus Campbell,
By Dyrenforth, Dyrenforth & Lee,
Att'ys.

UNITED STATES PATENT OFFICE.

ANGUS CAMPBELL, OF PITTSBURG, PENNSYLVANIA, ASSIGNOR TO AMERICAN COTTON PICKER COMPANY, OF PITTSBURG, PENNSYLVANIA, A CORPORATION OF PENNSYLVANIA.

COTTON-HARVESTER.

SPECIFICATION forming part of Letters Patent No. 685,441, dated October 29, 1901.

Application filed April 15, 1901. Serial No. 55,889. (No model.)

*To all whom it may concern:*

Be it known that I, ANGUS CAMPBELL, a citizen of the United States, residing at Pittsburg, in the county of Allegheny and State of Pennsylvania, have invented a new and useful Improvement in Cotton-Harvesters, of which the following is a specification.

This invention relates to improvements in cotton-harvesting machines of the type wherein a series of cotton-picker stems or spindles are thrust from opposite sides horizontally into the plants, rotated therein to gather cotton from the open bolls, and withdrawn into the machine and through stripper mechanism therein.

My improvements are shown and described in connection with a cotton-harvester of the type operated as above stated and for which Letters Patent of the United States were granted to me July 16, 1895, No. 542,794. The broadly unique characteristic of the said patented machine lies in the fact that the picker-stems are translated around two centers at the forward and rear ends of their course, whereby the picker-stems are thrust longitudinally into the plants, rotated for a prolonged period therein, and then withdrawn longitudinally from the plants through stripping mechanism in the machine, which removes the gathered cotton from the stems and discharges it onto elevators, which transfer the cotton to a receptacle or receptacles mounted upon or traveling with the machine. Attention is drawn to my aforesaid Letters Patent for a detailed explanation and illustration of its mechanism and operation.

The present invention relates more especially to improvements in the means for stripping the cotton-picker stems or spindles and for discharging the gathered cotton from the machine.

Figure 2:
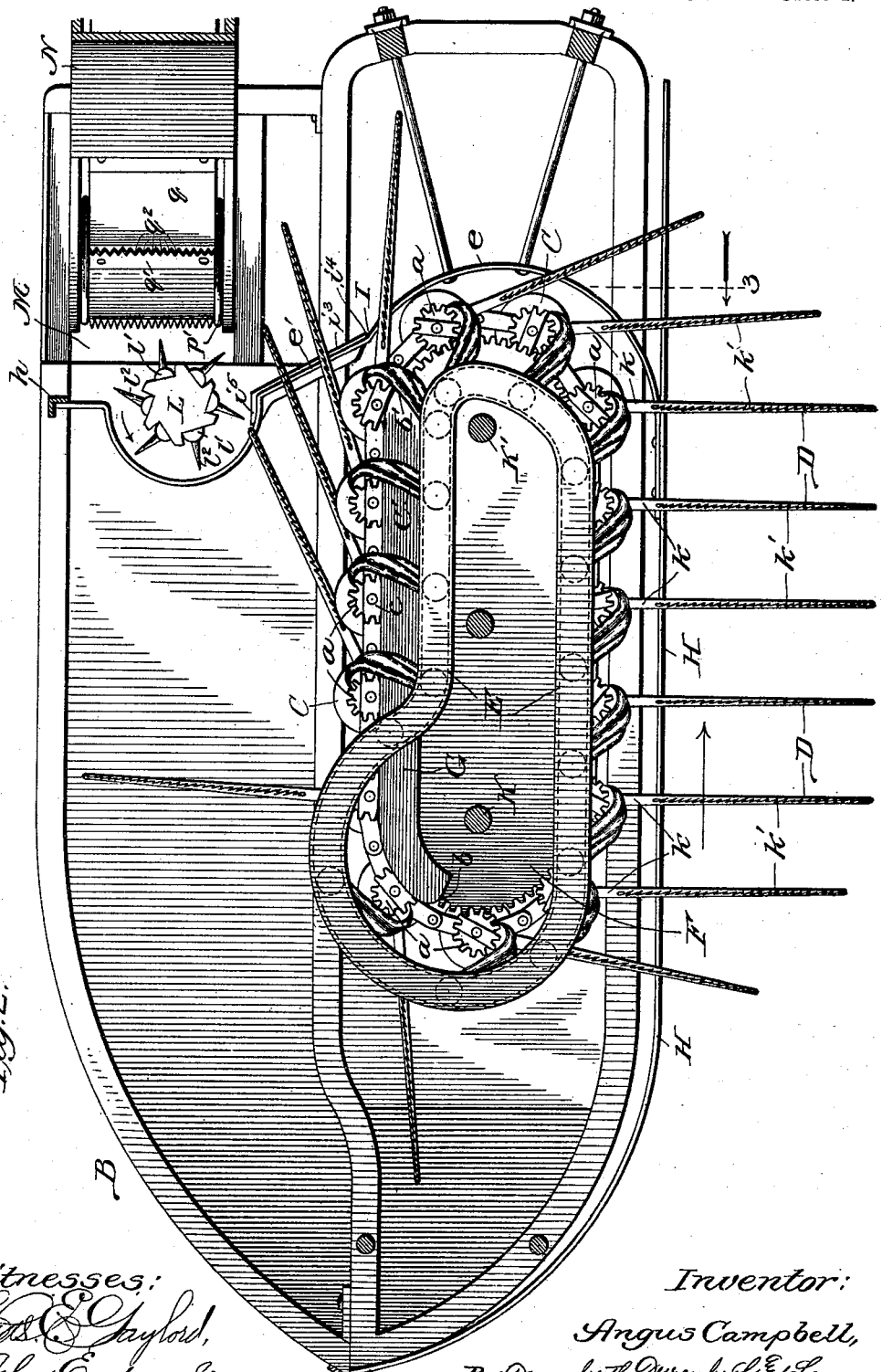
Figure 3:
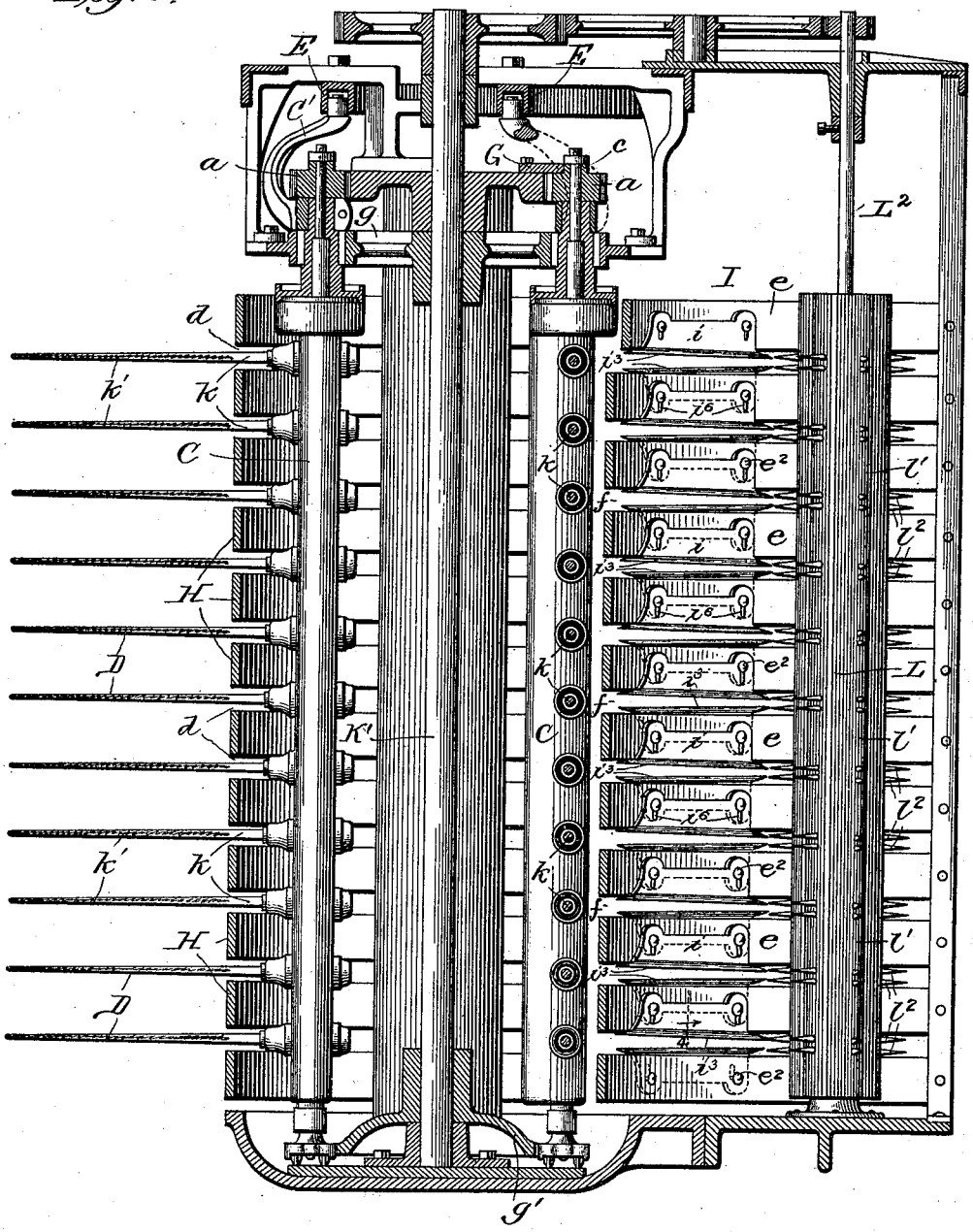
Figure 5:
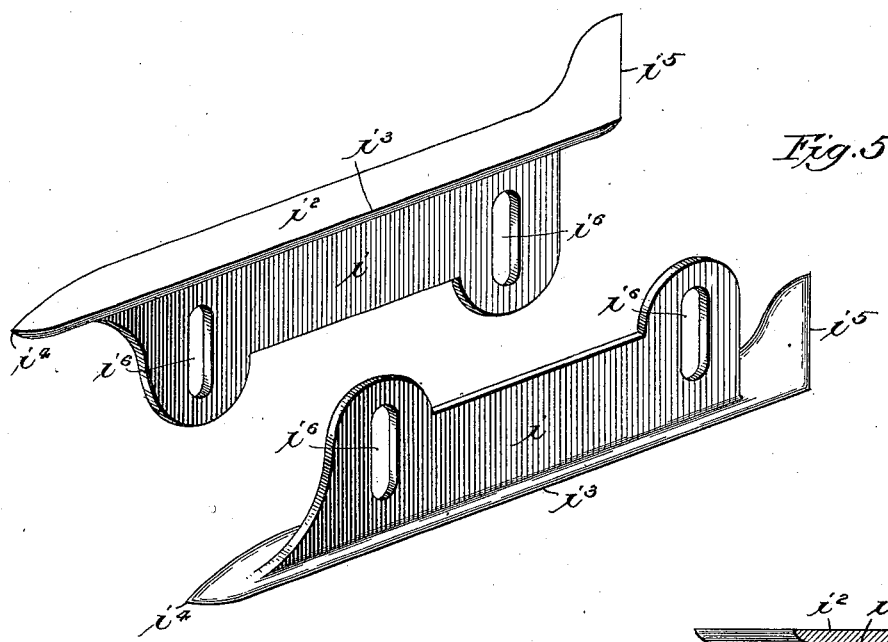
Figure 4:
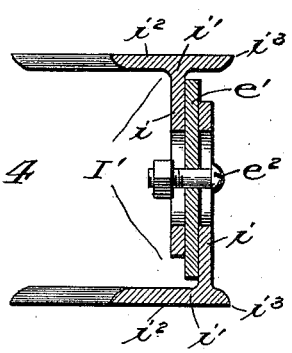
Figure 7:
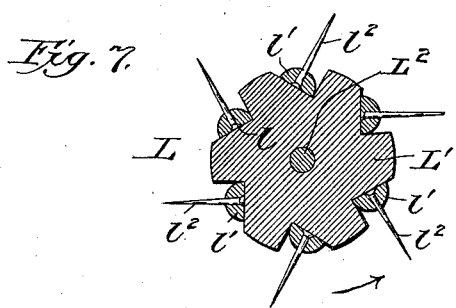
Figure 6:
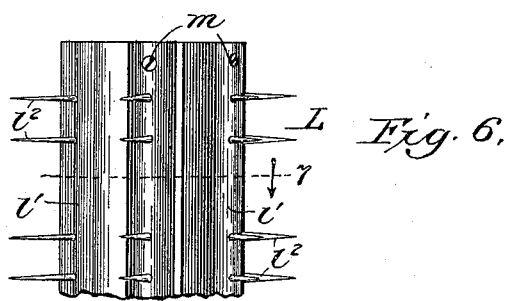

Referring to the drawings, Figure 1 is an elevation of one side of a cotton-harvester constructed with my improvements; Fig. 2, a plan sectional view, enlarged, of one of a pair of casings in which the picker-stem carriers are mounted to operate; Fig. 3, a section taken on line 3 in Fig. 2 and viewed in the direction of the arrow; Fig. 4, a section of one of the stripping slats or strips and its attachments, the section being taken on line 4 in Fig. 3 in the direction of the arrow and enlarged; Fig. 5 a perspective view of a pair of adjustable stripping-slat attachments; Fig. 6, a broken elevation of a spiked roller forming one of the details of construction of the stripping mechanism; Fig. 7, a section taken on line 7 in Fig. 6; Fig. 8, an enlarged broken longitudinal section through one of the elevators; Fig. 9, one of a series of toothed cotton-engaging strips carried by the elevator belt or apron; Fig. 10, an enlarged section of one of the elevator-drums; Fig. 11, a side elevation, enlarged, of the upper end of one of the elevators; and Figs. 12 and 13, perspective views, enlarged, of details of belt or apron tightening means employed in the elevators.

A is the main frame of the machine, mounted upon running-gear, the rear wheels of which operate to drive the moving parts of the machine. Adjustably mounted in the frames is a pair of casings B, one of which is shown in outer side elevation in Fig. 1 and the other on an enlarged scale in Fig. 2.

For the reason, as before stated, that the present case deals only with the stripping and elevating mechanisms for the gathered cotton but a brief description of the other parts of the machine will be given. The general construction of the machine here illustrated and a more specific description of the operation will be found in a separate concurrent application filed by me on the 15th day of April, 1901, Serial No. 55,888.

Carrier-tubes C, linked together in series and traveling an endless oblong course, are provided each with a series of picker stems or spindles D. On the carrier-tubes are arms C', traveling in a cam guide or race E, which operate while the carriers are moved in the direction of the arrow in Fig. 2 at a speed approximating that of the forward travel of the machine to translate or turn them on their axes and thrust the picker-stems longitudinally into an extended position at the forward end of their backward course and withdraw the picker-stems longitudinally out of the plants at the rear end of their backward course. The picker-stems are rotated on their individual axes by gear mechanisms in the carrier-tubes operated from pinions a, which engage the teeth on one side and opposite ends of a rack-plate F. The rack begins at the point b in Fig. 2 and ends at b'. Extending between the points b' b on the rear edge (the upper edge in Fig. 2) of the plate is a guide-plate G, against which short bosses c on the pinions a slide to prevent axial rotation of the picker-stems. The inner face of each of the casings B is formed with horizontal longitudinally-extending slats H, separated by longitudinal slots or openings d, through which the picker-stems move when pursuing their backward course in the plants. Extending across the casing, just in the rear of the path of the carriers, is the stripping mechanism I, consisting of a series of horizontal slats e, registering with the slats H and of approximately the same width. Between the slats e are horizontal slots or openings f, registering with and in the same horizontal plane as the openings or slots d. The chains which link the carriers together are propelled by a pair of upper and lower sprocket-wheels g g' on each of the driving-shafts K K'.

The slats e are fastened at one end to the slats H, describing an arc of a circle of which the shaft K' is the center, to a point approximately in the vertical plane of the guide G, inclining thence forward to produce a stright part e' and curving thence in a circle approximately half-way around a spiked roller L. They are fastened at their ends to a vertical bar h, forming a part of the main frame of the casing. All the strips e are constructed alike and are in all their parts in the same vertical plane as the similar parts of the other strips. As the picker-stems are withdrawn from the plants they move longitudinally into the machine while the carriers are moved around that end of the course. The carriers are then turned to pursue the forward course, swinging the picker-stems laterally to extend in a plane at an acute angle to the plane of the forward course of the carriers. When the carriers reach the beginning of their forward course, the lugs c engage the guide G to stop any further rotation of the picker-stems, and the engagement of the arms C' with the straight part of the race or guide E steadies the carriers while the stems are drawn longitudinally through the openings at the parts e' of the slats. Fastened to the slats at the parts e' are stripping attachments I', each of which consists of a pair of companion strips having attaching plate portions i and flanged heads i' extending laterally from opposite sides of the plates to present flat surfaces $i^2$. The upper member of each pair is secured to one face of the respective slat or strip e, and the other attachment is fastened to the other face of the same strip. The flange of each upper member is wider to the extent of the thickness of the strips e than the lower flange, whereby the heads present outer projecting edges $i^3$ in the same vertical plane. The forward ends of the heads or flanges i' are reduced to points $i^4$, and the rear or opposite ends of the flanges or heads project backward to present straight horizontal edges $i^5$ at an angle to the edges $i^3$, as shown. The attachments are provided with vertically-elongated slots $i^6$, through which they are connected by means of bolts $e^2$ with the slats or strips. The elongated openings $i^6$ permit the attachments to be adjusted to increase or diminish the widths of the openings f.

The picker stems or spindles are formed with shanks k and tapering stem portions k'. Each stem is formed with a longitudinal series of cotton-engaging teeth which project at an angle inclined toward the free end of the stem. The cotton gathered from the plants by the stems is wound upon the free end portions thereof more especially, so that in the movement of the stems to the parts e' of the slats they extend at their shank portions, or near their shank portions, through the slats. As the stems are drawn between the stripping attachments they are swung laterally a distance approximating the length of the attachments, and in their longitudinal movement the cotton is engaged by the edges $i^3$ and withdrawn or slipped from the stems longitudinally of the latter. For greater accuracy in operation the attachments are adjusted closer together at their ends $i^5$ than at the opposite ends, as shown in Fig. 3, to produce a gradual narrowing of the openings f approximating the gradual narrowing of the tapering stems during their longitudinal and lateral movement. The stems are finally withdrawn from the openings f as the ends of the picker-stems cross the surfaces $i^5$. In practice most of the cotton as it is slid from the stems will be carried around, owing to the interlacing of its fibers, to the ends $i^5$ of the stripper attachments, and unless suitable discharging means are provided tufts of the cotton will tend to pack in and clog said ends or to adhere at times to the end teeth of stems and be drawn through the strippers. To insure approximately complete throwing off of the cotton from the slats and from the stems as they pass to the ends $i^5$ of the attachments, I provide a cotton engaging and striking device, which is preferably in the form of a spiked roller L. This roller has a body portion L' upon a shaft $L^2$, which is geared to the driving power to rotate in the direction of the arrow in Fig. 2. The body portion is provided with vertical recesses, and fastened thereto in the said recesses are strips l', provided with cotton striking and discharging pins or spikes $l^2$. The strips may be fastened in place by screws m, as indicated in Fig. 6, and by preference two pointed pins or spikes are provided at each of the openings f upon each of the strips l', as plainly shown in Fig. 3. Just in the rear of the part e of the stripping-slats and the spiked roller is a receptacle M. The cotton stripped from the stems at e' will drop into the said receptacle. Any cotton carried by the stems to the ends of the attachments at $i^5$ would be engaged by the spikes or strikers on the roller M and thrown off to drop into the said receptacle.

Extending from the base of the receptacle upward in a backwardly-inclined direction is an elevator shaft or casing N. At the lower end of the casing is a cross-shaft $n$, carrying a drum $n'$, and in the upper end of the elevator-casing is a cross-shaft $p$, carrying a drum $p'$. Both drums may be constructed as shown in Fig. 10. Extending over the drums is an elevator belt or apron $q$, provided on its face with a series of transverse horizontal plates $q'$, the forward edges of which have inclined upturned teeth $q^2$. The shaft $p$ at opposite ends rests in and passes through sliding journal-plates $r$, having projecting bearings $r'$. The journal-plates $r$ slide in guide-plates $s$, having elongated openings $s'$ and adjusting or tightening screws $s^2$, which bear against the projecting bearings $r'$. By means of the screws $s^2$ the shaft $p$ and drum $p'$ may be forced upward to tighten the elevator-belt when desired. At the under side of the upper part of the casing N is a discharge-opening $t$, to which is attached a slatted extension N', inclined to direct the cotton discharged by the elevator in the downward and backward direction. In operation the cotton falling into the receptacle M is engaged by the toothed strips of the elevator and carried upward and discharged at N'.
The cotton thrown off by the spiked roller, as before described, will be discharged for the most part onto the belt $q$. The pins or spikes $l^2$ extend from the roller at an angle to the radius, being inclined in the backward direction, as shown. They operate in a sense as vanes or beaters to strike and throw off the cotton, and their points pick off any tufts that would tend to compact in and clog the openings at $i^5$.
The base of the chamber M, which is also the elevator-well, is formed by a concave casting or the like, R, removably secured to the base of the casing B by bolts R'.

The lower end of the elevator-shaft has a convex plate $R^2$ resting in the concave base R, like a ball in socket, to form a pivotal connection on which the elevator-shaft may be turned to different degrees of inclination. In adjusting the inclination of the shaft the drive-chain may be lengthened or shortened by putting in links or taking them out.

While I prefer to provide the parts forming my present invention as shown and described, they may obviously be modified in the matter of details of construction without departing from the spirit of my invention as defined by the claims.

What I claim as new, and desire to secure by Letters Patent, is—

1. In a cotton-harvester, the combination with the traveling, rotary, cotton-gathering picker-stems, and cotton elevating and discharging mechanism, of stripping means for the picker-stems comprising a series of cotton-gathering slats between which the stems are drawn, and a movable striking device adjacent to the slats operating in the direction contrary to the movement of the picker-stems to engage and throw the cotton from the said stripping-slats onto the said elevating mechanism.

2. In a cotton-harvester, the combination with the traveling, rotary, cotton-gathering picker-stems, and cotton elevating and discharging mechanism, of stripping means for the picker-stems comprising a series of cotton-gathering slats between which the stems are drawn, and an axially-rotating striking device adjacent to the slats operating in the direction contrary to the movement of the picker-stems to engage and throw the cotton from the said stripping-slats onto the said elevating mechanism.

3. In a cotton-harvester, the combination with the traveling, rotary, cotton-gathering picker-stems, of stripping mechanism therefor comprising a series of cotton-engaging slats between which the stems are drawn, and a movable striking device adjacent to the slats provided with backwardly-inclined strikers operating to engage and throw off the cotton stripped from the said stems, and thus prevent its clogging the openings between the stripping-slats.

4. In a cotton-harvester, the combination with the traveling, rotary, cotton-gathering picker-stems, and cotton elevating and discharging mechanism, of stripping means for the picker-stems comprising a series of cotton-gathering slats between which the stems are drawn, and a movable striking device adjacent to the slats provided with projecting striker-pins, operating in the direction contrary to the movement of the picker-stems to engage and throw the cotton from the said stripping-slats onto the said elevating mechanism.

5. In a cotton-harvester, the combination with the traveling, rotary, cotton-gathering picker-stems, and cotton elevating and discharging mechanism, of stripping means for the picker-stems comprising a series of cotton-gathering slats between which the stems are drawn, and an axially-rotating striking device adjacent to the slats provided with pointed projecting striker-pins operating in the direction contrary to the movement of the picker-stems to engage and throw the cotton from the said stripping-slats onto the said elevating mechanism.
6. In a cotton-harvester, the combination with the traveling, rotary, cotton-gathering picker-stems, of stripping mechanism therefor comprising a series of cotton-engaging slats having elongated openings between them through which the stems are drawn, a roller, adjacent to the slats, having two annular series of projecting cotton-discharging pins at each of the said openings, and means for rotating the roller.

7. In a cotton-harvester, the combination with the traveling, rotary, cotton-gathering picker-stems, of stripping mechanism therefor comprising a series of cotton-engaging slats having elongated openings between them through which the said stems are drawn, and means for preventing clogging of the said openings comprising a roller adjacent to the slats having annular series of projecting and backwardly-inclined cotton-discharging pins at the said openings, and means for rotating the roller.

8. In a cotton-harvester, the combination with the traveling, rotary, cotton-gathering picker-stems, of stripping mechanism therefor comprising a series of cotton-engaging slats having elongated openings between them through which the said stems are drawn, and means for preventing clogging of the said openings comprising a roller adjacent to the slats having annular series of projecting, backwardly-inclined and pointed cotton-discharging pins at the said openings, and means for rotating the roller.

9. In a cotton-harvester, the combination with the traveling, rotary, cotton-gathering picker-stems, of stripping mechanism therefor comprising a vertical series of horizontally-disposed slats having elongated openings between them through which the said stems are drawn, and horizontally-projecting stripping edges $i^3$ on the slats, substantially as set forth.

10. In a cotton-harvester, the combination with the traveling, rotary, cotton-gathering picker-stems, of stripping mechanism therefor, comprising a vertical series of horizontally-disposed slats having elongated openings between them through which the said stems are drawn, horizontally-projecting stripping edges $i^3$ on the slats, and stripping edges $i^5$ on the slats at an angle to the stripping edges $i^3$, substantially as set forth.

11. In a cotton-harvester, the combination with the traveling, rotary, cotton-gathering picker-stems, of stripping mechanism therefor comprising a series of horizontally-disposed slats having elongated openings between them through which the said stems are drawn, and relatively adjustable stripping attachments on the slats at the said openings formed with the attaching parts $i$ and flanged heads $i^2$ having stripping edges $i^3$ and $i^5$ at an angle to each other, substantially as set forth.

12. In a cotton-harvesting machine, the combination with the cotton-receptacle M and means for gathering and depositing the cotton in the said receptacle, of a concave plate forming the base of said receptacle, elevator-shaft extending upward from said plate in a backwardly-inclined direction, traveling apron in the said shaft, and a convex end plate for the said shaft resting in the said concave base-plate to permit adjustment of the inclination of said shaft, substantially as set forth.

In testimony whereof I have signed my name to this specification in the presence of two subscribing witnesses.

ANGUS CAMPBELL.

Witnesses:
ALBERT D. BACCI,
WM. B. DAVIES.